United States Patent [19]
Burgdorf et al.

[11] Patent Number: 4,964,681
[45] Date of Patent: Oct. 23, 1990

[54] ANTI-LOCK HYDRAULIC BRAKE SYSTEM

[75] Inventors: Jochen Burgdorf, Offenbach-Rumpenheim; Hans-Dieter Reinartz, Frankfurt am Main; Helmut Steffes, Hattersheim; Holger Von Hayn, Bad Vilbel; Peter Volz, Darmstadt; Hans Wupper, Freidrichsdorf; Gunther Buschmann, Griesheim; Erhard Beck, Weilburg; Gottfried Dehio, Frankfurt am Main; Dieter Dinkel, Eppstein/Ts.; Juergen Rausch, Eschborn, all of Fed. Rep. of Germany

[73] Assignee: Alfred Teves GmbH, Frankfurt am Main, Fed. Rep. of Germany

[21] Appl. No.: 383,775

[22] Filed: Jul. 21, 1989

[30] Foreign Application Priority Data
Aug. 12, 1988 [DE] Fed. Rep. of Germany ....... 3827366

[51] Int. Cl.$^5$ .............................................. B60T 8/40
[52] U.S. Cl. ...................................... 303/116; 303/119
[58] Field of Search ................. 188/181 A; 303/110, 303/111, 113, 115, 116, 119

[56] References Cited
U.S. PATENT DOCUMENTS
4,708,407 11/1987 Maehara ............................ 303/116

FOREIGN PATENT DOCUMENTS
| | | |
|---|---|---|
| 2428669 | 1/1975 | Fed. Rep. of Germany . |
| 3040548 | 5/1982 | Fed. Rep. of Germany . |
| 3247497 | 6/1984 | Fed. Rep. of Germany . |
| 3602430 | 7/1987 | Fed. Rep. of Germany . |
| 3704623 | 10/1987 | Fed. Rep. of Germany . |
| 3624722 | 1/1988 | Fed. Rep. of Germany . |
| 1435536 | 5/1976 | United Kingdom . |
| 2132718 | 7/1984 | United Kingdom . |

Primary Examiner—Duane A. Reger
Attorney, Agent, or Firm—Robert P. Seitter

[57] ABSTRACT

An anti-lock hydraulic brake system comprising a separating valve (14) and a regulating valve (19). A combined arrangement is provided wherein the valves are connected into each other. The movability (play s) of the piston (30) affords the event that a compensating volume for the control action in the event that the output of the pump is insufficient in specific situations requiring a large amount of fluid for control.

27 Claims, 6 Drawing Sheets

ANTI-LOCK HYDRAULIC BRAKE SYSTEM

BACKGROUND OF THE INVENTION

The present invention relates to an anti-lock hydraulic brake system comprising a master brake cylinder, a pump unit, a supply reservoir and at least one wheel brake. The system further comprises a brake line between the master brake cylinder and the wheel brake into which an inlet valve is inserted. A relief line is provided between the supply reservoir and the wheel brake into which an outlet valve is inserted. A pressure line leading from the pump unit to the brake line with a separating valve in the brake line between the master brake cylinder and the point where the pressure line terminates into the brake line. The separating valve is switched into its closed position by the pump pressure. A regulating valve is provided for generating a pump pressure in the pressure line which is proportional to the pressure in the master brake cylinder.

Such brake systems have been described in the following publications: DE-OS No. 24 28 669, DE-OS No. 32 47 497, and DE-OS No. 24 28 669. These brake systems operate according to the following description: During a conventional braking operation, that is during braking without wheel slip control, the separating valves in the brake lines are open so that there is direct communication between the master brake cylinder and the wheel brakes. By depression of the brake pedal, the driver generates in the master brake cylinder a braking pressure which is supplied to the wheel brakes by way of the brake lines which are not closed, whereby the vehicle is slowed down. The rotational behavior of the wheels is constantly monitored so that an imminent locked condition of a wheel can be detected at once by a control circuitry. In order to prevent locking of the wheel, pressure fluid is discharged from the wheel brake and is replenished out of a pump for the purpose of renewed pressure build-up when the wheel has reaccelerated sufficiently. At the same time, the separating valves close so that the master brake cylinder is no longer connected to the wheel brakes. Since the master brake cylinder is then shut off hydraulically, the pedal cannot be displaced any further and therefore remains in the position it just adopted. The pressure in the master brake cylinder serves as a control pressure for a regulating valve which adjusts the pressure fluid supplied by the pumps to a pressure which is proportional to the pressure in the master cylinder and, respectively, proportional to the pedal force.

The embodiments in the cited published patent applications each show a disintegrated mode of construction of separating valve and regulating valve. This necessitates a considerable assembling effort when mounting the system into an automotive vehicle, since the individual components must be interconnected by pressure lines. This problem could be avoided if the separating valve and the regulating valve are incorporated in one common housing. However, this does not avoid the shortcoming that such a combined unit requires considerable mounting space. Therefore, the present invention has for its first object to devise a compact, space-saving assembly unit of separating valve and regulating valve.

Further, the systems described in the noted publications bear still another disadvantage. As has been explained above, pressure fluid is discharged out of the wheel brakes for regulating the wheel slip and is supplied into the wheel brakes after re-acceleration of the wheel. Depending upon how many control cycles per time unit are performed and how much pressure fluid was discharged, the pump must make available a specific volume of pressure fluid per time unit. The number of control cycles and the quantity of the discharged fluid depends on the friction conditions between the road surface and the tires. There is great volume requirement per time unit particularly when the transmissible forces between tires and road surface constantly vary. The consequence thereof is that when dimensioning the fluid output of the pump, one has to provide for this particular case. Therefore, the pump unit and hence the entire brake system become more costly.

Thus, it is another object of the present invention to provide means permitting the pump rate of delivery to be kept as small as possible, while nevertheless making available a sufficient quantity of pressure fluid in every situation. These means are combined with the separating valve and the regulating valve, if desired.

SUMMARY OF THE INVENTION

The first object of the present invention is achieved in that the valve passage of the separating valve is arranged on the operating piston of the regulating valve, or in that the valve passage of the regulating valve is arranged on the operating piston of the separating valve.

In the following description, the term valve passage is the area penetrated by pressure fluid which is, by means of a closure member, either closed entirely or narrowed to the extent that, as a function of the pressure gradient in front of and behind the valve passage, only a predetermined pressure fluid flow is realizable. The term operating piston refers to that part which is exposed to forces determining the throttling of the valve passage. These forces can be spring forces, pressure forces or other actuating forces.

The three mentioned elements, that is the operating piston, closure member and valve passage can be combined in various ways. For example, the operating piston can form a construction unit with the valve closure member. The valve passage can be arranged both in a housing and in an operating piston. The arrangement becomes particularly compact when the operating piston of the regulating valve is placed in the operating piston of the separating valve. Reliable closing of the separating valve is achieved in that the operating piston of the separating valve is designed as a stepped piston, the smaller surface being exposed to the master cylinder pressure and the larger surface being exposed to the pump pressure. The annular chamber designed on the step transition is connected with the supply reservoir. This affords the expedient possibility of having the valve passage of the regulating valve extend from the pump pressure chamber into the annular chamber.

Further, it is also possible to arrange the operating piston of the regulating valve in an axial bore of the operating piston of the separating valve, the one end surface of the operating piston being adjacent to the inlet chamber communicating with the master cylinder. To accomplish reliable opening of the separating valve, the operating piston of the separating valve is loaded by a spring in the opening sense.

Preferably, the valve passage of the separating valve can be provided in the housing opposite to the smaller end surface of the operating piston of the separating valve. A particularly simple embodiment is obtained when a piston performs the function of the operating piston for both the separating valve and the regulating valve. In order to accomplish a reliable closing of the separating valve in this case, an additional piston is provided which furnishes an additional pressurization surface. This additional piston is movable into abutment on the operating piston and pump pressure is applied on its additional surface. To augment the operating pressure, a throttle can be inserted into the pressureline so that the accumulating pressure is applied to the additional piston in front of the throttle.

A compact design also is achieved when the operating piston of the separating valve is arranged in the operating piston of the regulating valve. Further, it is advantageous in this event to arrange the valve passage of the separating valve in the operating piston of the regulating valve. The mode of construction is simplified further by placing also the valve passage of the regulating valve in the operating piston of the regulating valve, the closure member of the regulating valve being located in a bore of the operating piston. The closure member cooperates with a pin formed with the housing.

The second object of the present invention is achieved in that an accumulator cylinder is connected in parallel to the separating valve and wherein an accumulator piston is sealingly guided in the accumulator cylinder whose one end face is adjacent to a master-cylinder pressure chamber, while its other end face is adjacent to an accumulator chamber. As two alternative arrangements, it is possible to (i) define the initial piston of the accumulator piston such that the chamber which is connected with the master brake cylinder has the smallest volume, or (ii) to define the initial position of the accumulator piston such that the accumulator chamber which is connected to the wheel brakes has the smallest volume. To combine the accumulator cylinder with the combined separating and regulating valves, there are several possibilities. First, the accumulator piston can be designed as an annular piston which is arranged around the operating piston of the separating valve. The arrangement becomes particularly simple when the operating piston of the separating or the regulating valve performs the function of the accumulator piston. The pre-condition therefor is that either the closure member of the separating valve or the closure member of the regulating valve is movable relative to the respective operating piston. This means that upon movement of the accumulator piston beyond a specific position, the accumulator chamber being decreased as a result, the separating valve continues to remain closed, or that the closure member of the regulating valve is displaced beyond the position of regulation. Furthermore, it has been found to be expedient to insert a pressure-retaining valve into the pressure line ahead of the regulating valve so that the dynamic pressure can be utilized as operating pressure for the operating piston of the separating valve.

It is pointed out that the brake system also can be employed for traction slip control. To this end, it is merely necessary to insert a traction slip control valve into the brake line so that either the master brake cylinder or the pump unit is connected to the brake line. As soon as a traction slip control action becomes necessary, the master brake cylinder is decoupled from the brake line and, instead, is connected to the pump unit. As a result, the brakes can be supplied with pressure fluid without the need to depress the pedal.

BRIEF DESCRIPTION OF THE DRAWING

FIG. 1 illustrates the entire brake system in accordance with the present invention, while

DETAILED DESCRIPTION

Figure 1:
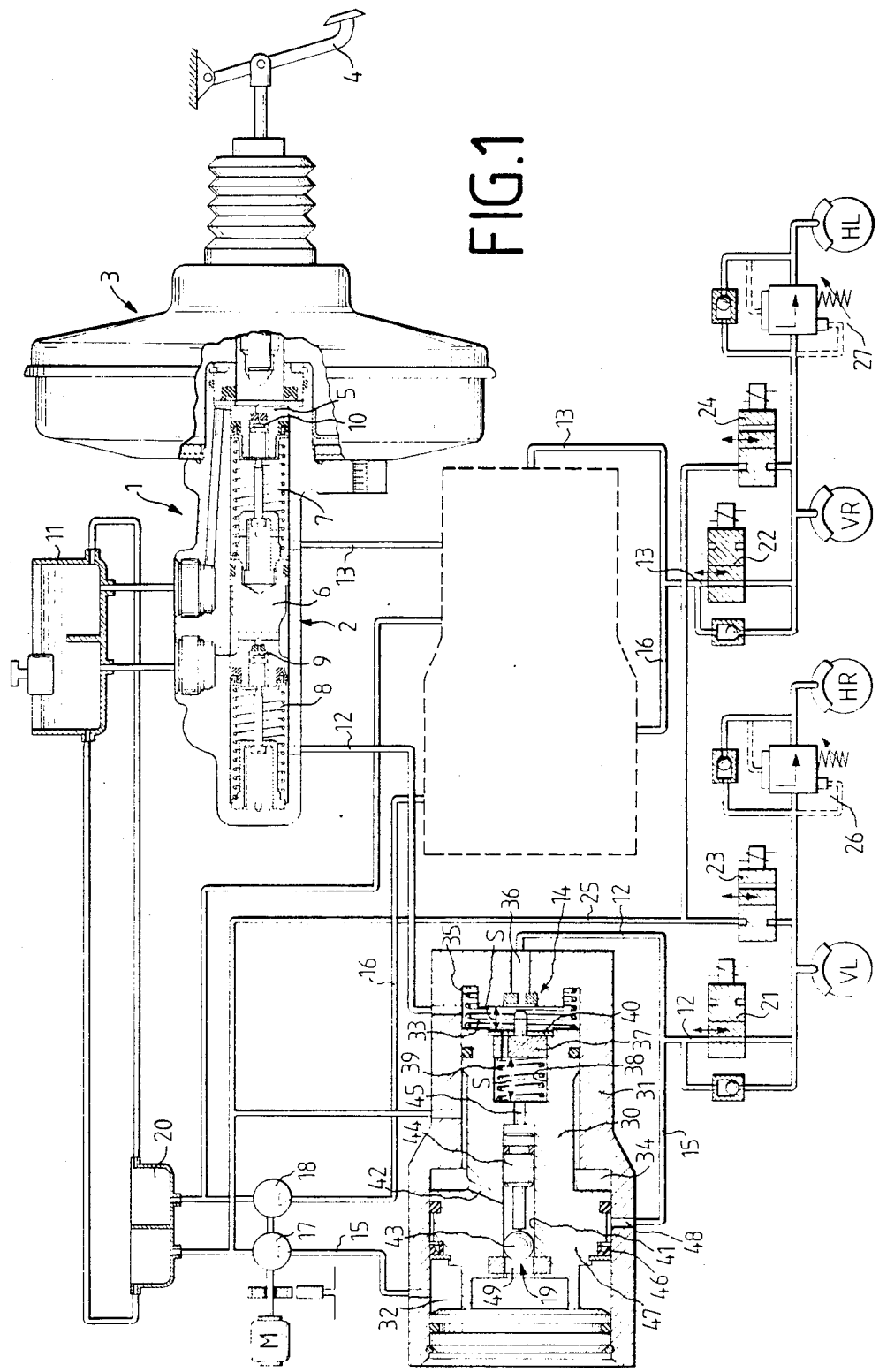

Referring now to FIG. 1, the brake system illustrated therein consists of a braking pressure generator 1 which is composed of a master brake cylinder 2 and a pneumatic vacuum booster 3 inserted in front thereof. The booster is actuated by a pedal 4. A push rod piston 5 and a floating piston 6 are guided in a bore of the master brake cylinder 2, whereby two working chambers 7 and 8 are formed. Central valves 9 and 10 are arranged in the pistons 5 and 6, which are open in the initial position of the master brake cylinder 2 and thus establish a connection between the working chambers 7 and 8 and the supply reservoir 11. The central valves 9, 10 close when the brake is applied so that pressure can develop in the working chambers 7 and 8. By way of brake lines 12 and 13, the working chambers 7, 8 are in communication with the wheel brakes which are referred to by letter combinations, with V standing for front, H for rear, L for left and R for right. Terminating into the brake lines 12, 13 are pressure lines 15, 16 which connect to a pump unit consisting of a double pump 17, 18. The pumps 17, 18 supply fluid out of an intermediate reservoir 20 which communicates with supply reservoir 11.

A separating valve 14 is inserted into the brake line 12 which closes in the event of a brake slip control action. A corresponding valve (not illustrated) is arranged in the brake line 13. A regulating valve 19 is arranged in the pressure line 15 which adapts the pressure at the pump outlet to the master cylinder pressure. A corresponding valve is (not illustrated) also inserted into the pressure line 16. Separating valve 14 and regulating valve 19 are combined to form a construction unit, which is described in more detail hereinbelow.

The wheel brakes are comprised in pairs, and a diagonal split-up is presented in the illustrated embodiment. That is the wheel brakes of diagonally opposite wheels on an automotive vehicle are connected either to working chamber 7 or 8 of the master brake cylinder 2. Allocated to the wheel brake pairs respectively is one inlet valve 21 and 22 which is inserted into the brake line 12 and 13, and underneath the point where the pressure line 15 and/or 16 terminates. Further, the wheel brakes communicate by way of a relief line 25 with the supply reservoir 11. An outlet valve 23 and 24 is inserted into the respective branch line of the relief line 25. Connected in front of each wheel brake of the rear axle HR and HL respectively, is one pressure-limiting valve 26 and 27 which reduces the pressure in the wheel brakes of the rear axle relative to the pressure in the wheel brakes of the front axle, for example in dependence upon the axle load on front and rear axles of the vehicle. The described allotment of the brake circuits is only an example and any other known allotment can be chosen.

FIG. 1 further illustrates an embodiment of the combined separating and regulating valve 14, 19. An essential component part of the combination valve 14, 19, which in a similar manner also is inserted into the brake line 13 and into the pressure line 16, respectively, is a stepped piston 30 which provides the function of an operating piston for the separating valve 14. The stepped piston 30 confines with its smaller end face a master-cylinder inlet chamber 33 which is in direct communication with the master brake cylinder. The larger end face bounds a pump inlet chamber 32 which is connected to the pump outlet. Disposed at the transition from the smaller to the larger step of the stepped piston 30 is an annular chamber 34 which is in communication with the supply reservoir 11.

The wall of the housing 31 which is opposite to the smaller step of the piston 30 contains the valve passage 36 of the separating valve. The closure member 37 of the separating valve includes a piston which is guided in an axial blind-end bore 38 of the stepped piston 30. A spring 39 urges the closure member 37 against a stop 40 at the end of the blind-end bore. A spring 35 urges the stepped piston 30 to the left in the illustration of FIG. 1 so that the inlet chamber 33 contains its largest volume. In this position of the stepped piston 30, the closure member 37 is at a given distance from the valve passage 36 so that the valve passage 36 is open and a pressure-fluid connection exists between the master brake cylinder 2 and the connected wheel brakes.

Another axial blind-end bore 41 in the stepped piston 30 terminates into the pump inlet chamber 32. The blind-end bore 41 and the blind-end bore 38 are interconnected by way of a connecting channel 45. The operating piston 44 for the regulating valve 19 is sealingly guided in the blind-end bore 41, and the pressure in the master-cylinder inlet chamber 33 and the blind-end bore 38, respectively, is applied to one end face of the operating piston by way of the connecting channel 45.

At its open end, the blind-end bore 41 is confined by a valve seat which forms the valve passage 49 for the regulating valve. The valve passage 49 is closable by a valve ball 43 which cooperates with the operating piston 44. A transverse bore 42 connects the annular chamber 34 with the blind-end bore 41 so that a pressure-fluid connection is established between the pump inlet chamber 32 and the annular chamber 34 when the valve passage 49 of the regulating valve is opened. The connection between the pump inlet chamber 32 and the wheel brakes is provided by way of an annular groove 47 at the outside edge of the larger step of the stepped piston 30 which corresponds with a lateral port 48 in the housing 31. The annular groove 47 is connected to the inlet chamber 32 by way of a sleeve 46 acting as a non-return valve. The sleeve 46 is fitted such that pressure-fluid flow is permitted only from the chamber 32 to the wheel brakes.

During a conventional braking operation, that is during braking without slip control, chamber 32 is unpressurized since the pump 17 and 18, respectively, does not deliver fluid. The master-cylinder pressure is prevails in chamber 33. Since the piston 30 is urged to the left by the spring 35, the separating valve 14 is open, and there is a pressure-fluid connection between the master brake cylinder 2 and the wheel brakes. The sleeve 46 prevents the master-cylinder pressure from propagating into the chamber 32. For the purpose of anti-lock control, the pumps 17, 18 are switched on, whereby pressure fluid is delivered into the inlet chamber 32. The pressure fluid urges the stepped piston 30 to the right, with the result that the closure member 37 moves into abutment on the valve passage and closes the brake line 12. The stepped piston 30 moves beyond this closed position further to the right, the spring 39 and the spring 35 being compressed as a result. The separating valve remains closed, the pressure fluid out of the chamber 33 is delivered back into the master brake cylinder, a reserve volume being caused thereby. The free travel S of the stepped piston 30 in the housing 31 as well as that one of the closure member 37 in the blind-end bore 38 is sized accordingly.

The piston 44 continues to be loaded by the master cylinder pressure and keeps the valve passage of the regulating valve 19 closed, since the valve ball 43 is urged on the corresponding valve seat and closes the valve passage 49. Only when the pressure in the chamber 32 has reached the magnitude of the master cylinder pressure will the valve passage be opened so that excessive pressure fluid propagates by way of the transverse line 42 into the annular chamber 34 and from there into the supply reservoir 11. In this manner, there is always attained a balance between the pressures in the master brake cylinder 2 and at the outlet of the pump 17 and 18, respectively. Yet the pressure fluid of the pump propagates also by way of the sleeve 46, the annular chamber 47 and the port 48 into the pressure line 15 and to the wheel brakes. However, this pressure fluid will not reach the master brake cylinder since the separating valve 14 is closed.

Figure 2:
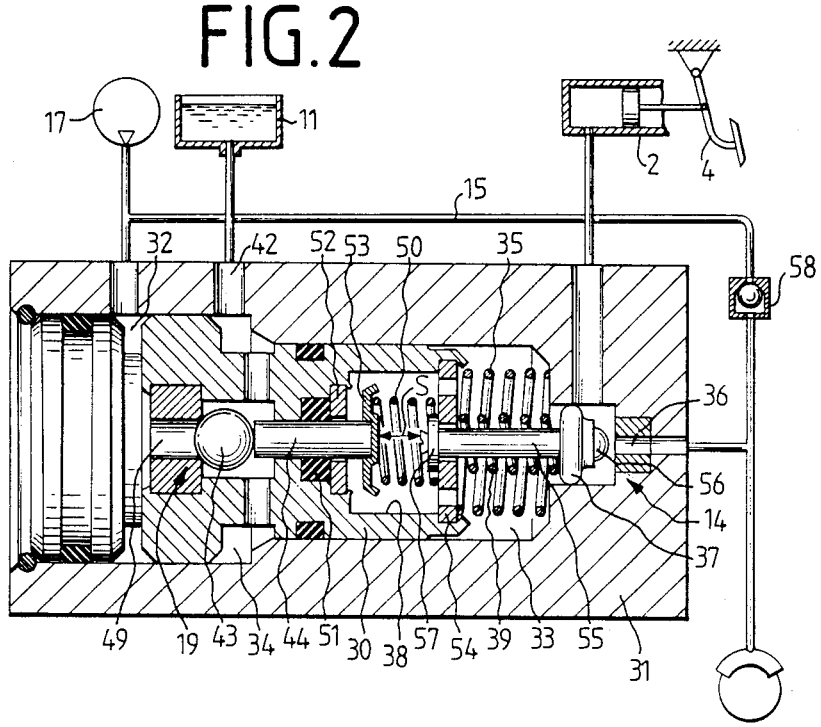
FIGS. 2–10 depict the embodiments of the combined pressure and regulating valve.
Figure 3:
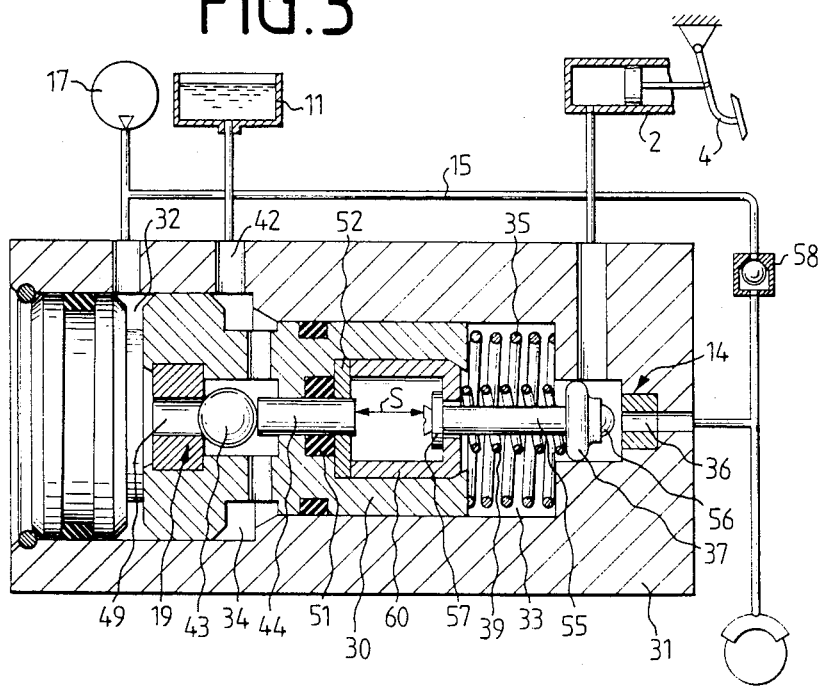

FIGS. 2 and 3 show modifications of the combined pressure and regulating valve 14, 19, particularly for the connection of the closure member 37 of the separating valve with the associated operating piston 30. In FIG. 2 the blind-end bore 38 in confined by a perforated disc 54, the stem 55 of the closure member 37 extending through the central bore of the disc 54. An annular washer 57 fitted to the stem 55 prevents the stem 55 from sliding back out of the bore. The spring 39 is supported on the head 56 of the closure member, on the one hand, and on the annular washer 57, on the other hand. The depth of the blind-end bore is chosen such that the stem 55 has sufficient space when the stepped piston 30 displaces in the direction of decreasing the master-cylinder inlet chamber 33. The operating piston 44 of the regulating valve 49 is designed as a plunger piston and is sealingly guided in an axial bore of the stepped piston 30. The seal 51 is inserted into an annular groove in the stepped piston 30, the one flank of the annular groove being formed by an annular washer 52 which is held by a beaded portion.

In order to generate a minimum dynamic pressure in the pump inlet chamber 32, it is provided that the operating piston 24 is acted upon by spring force. On the one side, the prestressing spring 50 bears against the washer 54 and on the other side by way of a plate 53 on the operating piston 44 of the separating valve 19. In this embodiment, the connection between the pump outlet and the wheel brakes is effected by way of a separately illustrated non-return valve 58 which, in its function, corresponds to the sealing sleeve 46 according to FIG. 1. In the embodiment according to FIG. 3, instead of the disc 54, a bowl 60 is employed, the bowl rim clamping in the washer 52 for retaining the seal 51. Hence, there is no need for any special bead. The embodiments according to FIGS. 2 and 3 are identical in all other respects.

The previously described embodiments form a reserve volume in the master brake cylinder. Depending upon how extensive the reaction on the brake pedal is desired to be, this reserve volume can be chosen to be large or small. This reserve volume is available should the pressure-fluid supply out of the pumps fail totally during a brake slip control action. In this event, the master cylinder pressure urges the stepped piston 30 to the left so that first the pressure fluid propagates out of the pump inlet chamber 32 to the wheel brake. As soon as the piston 30 has reached its basic position, the separating valve 14 will open so that a direct connection is established between the master cylinder 2 and the wheel brake.

Figure 4:
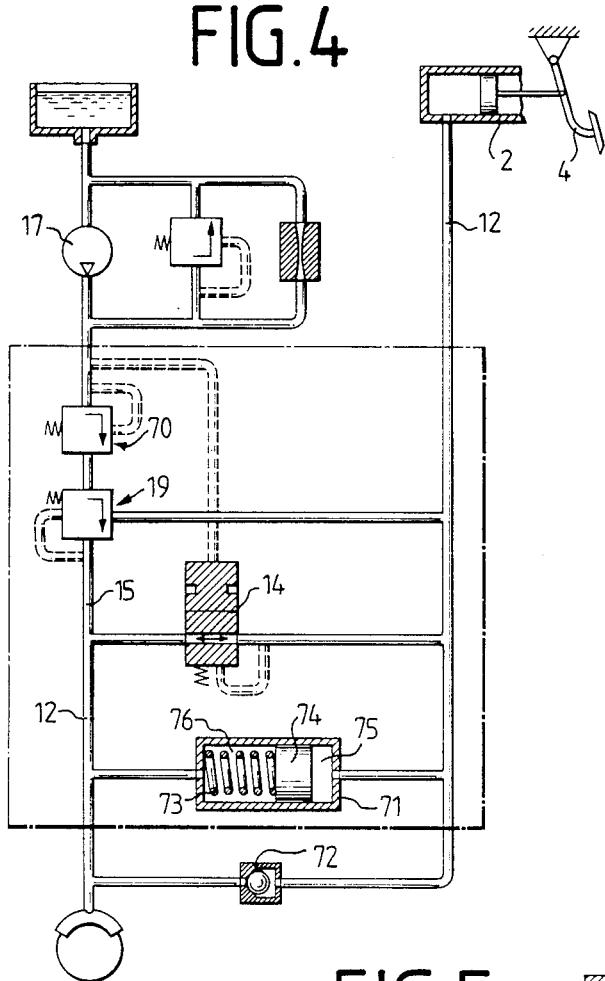

A much more frequent occurrence than the total failure of the pressure-fluid supply is an extremely fluctuating pressure-fluid requirement of the wheel brakes wherein the pumps are not in a position to make available a high peak demand because the rate of delivery of the pump was chosen to be small for cost reasons. This is because if more pressure fluid is taken from the pump inlet than the pump 17 or 18 is able to replenish, the piston 30 will move under the effect of the pressure in the master brake cylinder, that is in the sense of decreasing the chamber 32 and increasing the chamber 33. The pressure fluid out of the chamber 32 is available as additional volume. In this case, pressure fluid must be taken from the master brake cylinder. A principle view of such circuitry is illustrated in FIG. 4. Interposed into the brake line 12 and 13, respectively, is the separating valve 14 which is switchable by the pressure at the pump outlet to adopt its closed position. Terminating into the brake line 12 is the pressure line 15, 16 into which a regulating valve 19 is inserted whose control pressure is represented by the master cylinder pressure. Connected upstream of the regulating valve 19 is a pressure-retaining valve 70 which constantly generates a low supply pressure at the pump outlet.

Connected in parallel to the separating valve 14 is a non-return valve 72 which closes towards the wheel brakes. Additionally, a charging chamber means 71 is connected in parallel to the separating valve 14 which comprises a piston 74 and a spring 73. On the one side, the piston confines a chamber 75 which is connected with the master brake cylinder 2, while on the other side it confines a chamber 76 which is connected with the wheel brakes. The spring 73 keeps the piston in a position where the chamber 75 has its smallest volume and the chamber 76 has its largest volume. This is a basic position. As long as the separating valve 14 is open, the pressures are equal on either side of the piston 74 so that the latter remains in its basic position. Even during a brake slip control operation when the separating valve 14 is closed, the pressure is identical on both sides of the piston 74 since the regulating valve 19 in the brake line portion downstream of the separating valve 14 adjusts a pressure proportional to pedal force. Only when the slip volume of the wheel brakes is so large in special cases that the pressure drops at the outlet of the pump will the piston 74 no longer be pressure-balanced. The master cylinder pressure displaces the piston 74 in the sense of a decrease of the chamber 76, whereby additional pressure fluid can propagate into the wheel brakes. The pressure fluid in the chamber 75 emanates from the master brake cylinder 2, the result being that the brake pedal is easily depressed through its full travel. However, this case will not occur frequently because the situation is rare that the wheel brakes have a greater demand for pressure fluid than the pumps can make available at that moment. As soon as the pump 17 and 18, respectively, again has sufficient pressure fluid available, the pressure fluid also will reach the chamber 76 so that the spring 73 is in a position to reset the piston 74 into its basic position.

It is another function of the non-return valve 72 to limit the pressure in the wheel brake cylinders to the pressure in the master brake cylinder. This affords the possibility that the driver can reduce the wheel brake cylinder pressure by lessening the pedal force in order to intervene in the control action also during a brake slip control in the sense of reducing the braking pressure.

Figure 5:
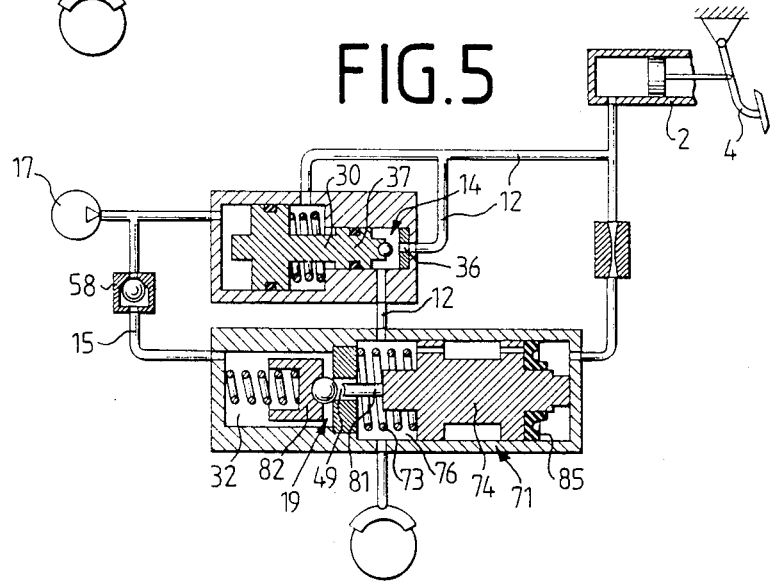

A second representation of the basic block diagram of FIG. 4 is depicted in FIG. 5. The separating valve 14 comprises a stepped piston 30 whose larger step is acted upon by the pump pressure. Mounted on the smaller step of the stepped piston 30 is a closure member 37 which is movable into sealing abutment on the valve passage 36 of the separating valve 14.

The charging chamber means 71 as well as the regulating valve 19 are combined to form a construction unit. The piston 74 of the charging chamber means 71 simultaneously performs the function of the operating piston for the regulating valve 19. Therefore, the chamber 73 is in communication with the pump inlet chamber 32 by way of a valve passage 49. The valve passage 49 is governed by a closure member 82 which is arranged in the pump inlet chamber 32 and is placed by a spring on the valve passage 49 for sealing. A tappet 81 which is adjacent to the piston 74 extends through the valve passage 49 and is movable to bear against the closure member 82.

The pressure in the chamber 76 always corresponds to the pressure in the chamber 75 which equals the master cylinder pressure. When the pressure in the chamber 76 drops because pressure fluid is removed from the wheel brakes, the piston will move to the left, and as a result the tappet 81 lifts the valve closure member 82 from the valve passage 49. This way, pressure fluid flows from the pump by way of the pump inlet chamber 32 into the chamber 76. Should the quantity of pressure fluid not suffice, then piston 74 will continue to move to the left so that the pressure fluid displaced out of the chamber 76 is supplied to the wheel brakes. The function of the non-return valve 72 is performed by the pressure sleeve 84.

Figure 6:
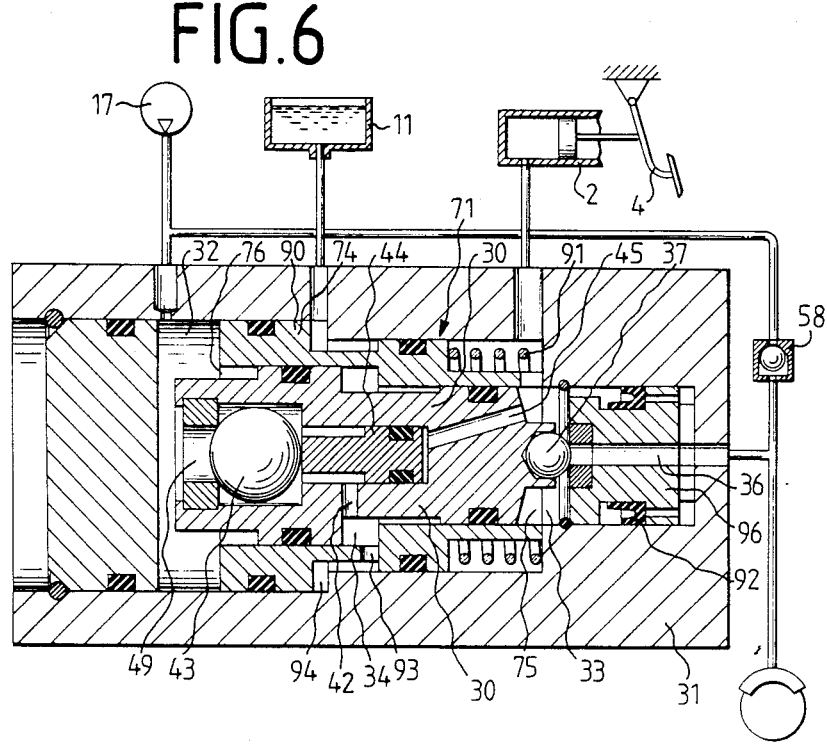

A still more compact construction of the hydraulic unit is illustrated in FIG. 6 which partly comprises elements which have been referred to in the description of FIGS. 1, 2 and 3. In contrast to the design form of these Figures, movability of the closure member 37 of separating valve 14 in relation to the stepped piston 30 has been dispensed with. In this embodiment, the piston 74 of the charging chamber means 71 is arranged as an annular piston 90 which is arranged coaxially to the stepped piston 30. Accordingly, the annular piston 90 is sealingly guided in the housing 31, while the stepped piston 30 is sealingly guided inside the annular piston 90. The annular chamber 34 of the stepped piston 30 is in communication with an annular chamber 94 by way of a transverse bore 93 which, in turn, communicates with the supply reservoir 11. The combination of separating valve 14 and regulating valve 19 operates according to the arrangement described hereinabove. The annular piston 90 is retained by a spring 91 in a position which corresponds to the smallest volume of chamber 76 and the largest volume of chamber 75. This chamber 76 is identical with the pump inlet chamber 32 in this embodiment, while chamber 75 is identical with the master-cylinder inlet chamber 33. The effective surface of the annular piston 90 which is adjacent to the chamber 32 and 76, respectively, is chosen to be somewhat larger than the effective surface which is adjacent to the chamber 75 and 33, respectively. When the pump starts to deliver fluid, both the stepped piston 30 and the annular piston 90 will displace, as a result whereof the separating valve 14 is closed and a reserve volume is delivered into the master brake cylinder 2. When the pressure in chamber 32 and/or 76 decreases because the rate of delivery of the pump momentarily is not able to satisfy the pressure fluid demand of the wheel brake, the annular piston 90 will move to the left, whereby pressure fluid is supplied out of the chamber 32 and/or 76 into the wheel brakes. The function of the non-return valve 72 is realized by annular sleeves 92 on an insert member 96 for the valve passage 36 of the separating valve.

Figure 7:
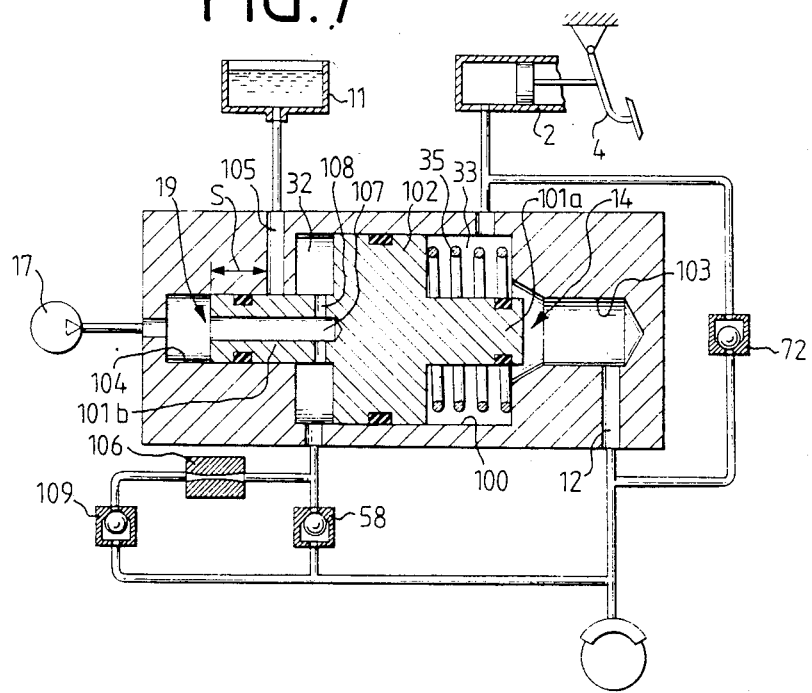

FIG. 7 illustrates an alternative embodiment with slide-type valves instead of seat valves being employed. Piston 102, the function of which corresponds to that one of the stepped piston 30 described hereinabove is sealingly guided in a bore 100 and confines on its one side the master-cylinder inlet chamber 33 and on its other side the pump inlet chamber 32. Adjacent on the one side is a slide 101a which is sealingly slidable in a bore 103. Bore 103 has a connection to the wheel brakes.

When slide 101a is moved into bore 103, the connection between the master brake cylinder 2 and the wheel brakes will be interrupted. Separating valve 14 is formed in this manner. On the other side of the piston 102, a second slide 101b is provided which is sealingly guided in a bore 104. This slide 101b closes a port 105 to the supply reservoir 11. The pump delivers fluid through a longitudinal bore 107 and a transverse bore 108 into the pump inlet chamber 31. When the piston 102 is displaced to the right in the illustration according to FIG. 7, whereby the separating valve closes, then slide 101b will open the port 105 to the supply reservoir 11 after having performed a travel, and excessive pressure fluid can discharge out of the pump into the supply reservoir. Corresponding to the surface ratios at the piston 102 with the coupled slides 101a and 101b, a pressure ratio will be caused in the chambers 32 and 33. Since the piston 102 must cover a specific distance for opening the port 105, a reserve volume is formed in the chamber 32 which can be made available to the wheel brakes in case the pump's capacity does not suffice.

The chamber 32 is connected to the wheel brakes by way of the previously known non-return valve 58. Connected in parallel to the separating valve is a non-return valve 72 which has been previously described. Arranged in parallel to the non-return valve 58 is another non-return valve 109 together with a diaphragm 106 connected in series. By favorably selecting the respective prestress of the non-return valves as well as the diaphragm cross-section, the control behavior can be positively influenced.

Figure 8:
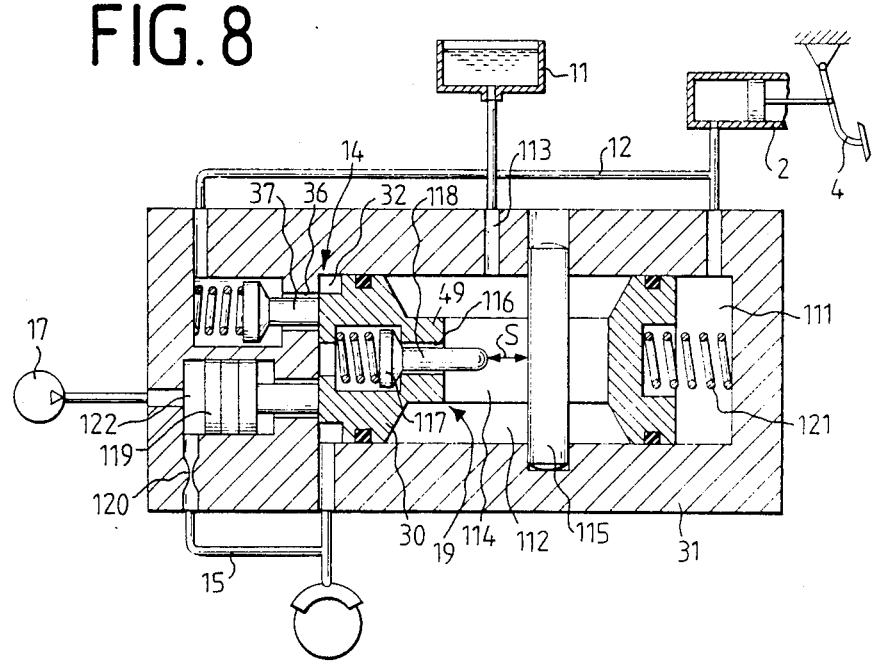

Another embodiment is shown in FIG. 8. With its one end face, the operating piston 30 confines a pressure chamber 111 which communicates with the master brake cylinder 2. The other end face of the piston confines the pump inlet chamber 32. The piston 30 contains an annular groove 112 which is in communication with the supply reservoir 11 by way of a port 113. The piston 30 is slotted (slot 114) in its intermediate portion, a pin 115 that is formed fast with the housing penetrating this slot 114. Additionally, the piston 30 incorporates a longitudinal bore 116 which forms the valve passage 49 for the regulating valve. The valve passage 49 is governed by a valve closure member 117 which projects with a tappet 118 through the valve passage 117 and is movable into abutment on the pin 115 formed fast with the housing. Further, in pump inlet chamber 32 communicates by way of a valve passage 36 with the master-cylinder inlet chamber 33. This valve passage 36 is controlled by a closure member 37 which protrudes with a tappet through the valve passage 36 and abuts on the end face of the piston 30.

A spring 121 keeps the piston 30 in a position in which the closure member 37 is lifted from the valve passage 36 and the closure member 114 closes the valve passage 116. An additional piston 119 projects with its one end into the pump inlet chamber 32 and abuts on the corresponding end surface of the piston 30. The other end surface of the additional piston 119 is acted upon directly by the pump pressure. The pressure chambers on the two end surfaces of the additional piston 119 are interconnected by way of a diaphragm 120.

In the initial position, the master cylinder pressure prevails both in the pump inlet chamber 32 and in the chamber 111 so that the piston 30 is pressure-balanced and is disposed in its illustrated initial position. The brake line 12 and/or 13 between the wheel brake cylinders and the master brake cylinder 2 is open. The pump drive is switched on with the commencement of slip control, so that pressure fluid is supplied into the chamber 122. Because of the diaphragm 120, pressure higher than that in the pump inlet chamber 32 will accumulate here. As a result, due to the additional piston 119, an additional force acts upon the piston 30, whereby the latter is displaced to the right according to the illustration of FIG. 8. The separating valve 14 (valve passage 36, closure member 37) closes, and the regulating valve 19 (closure member 117, valve passage 116) opens, and that is to say after the piston 30 has covered a distance s. This distance s is formed by the distance between the pin 115 and the tappet 118. A reserve volume is formed in the pump inlet chamber 32 this way.

Figure 9:
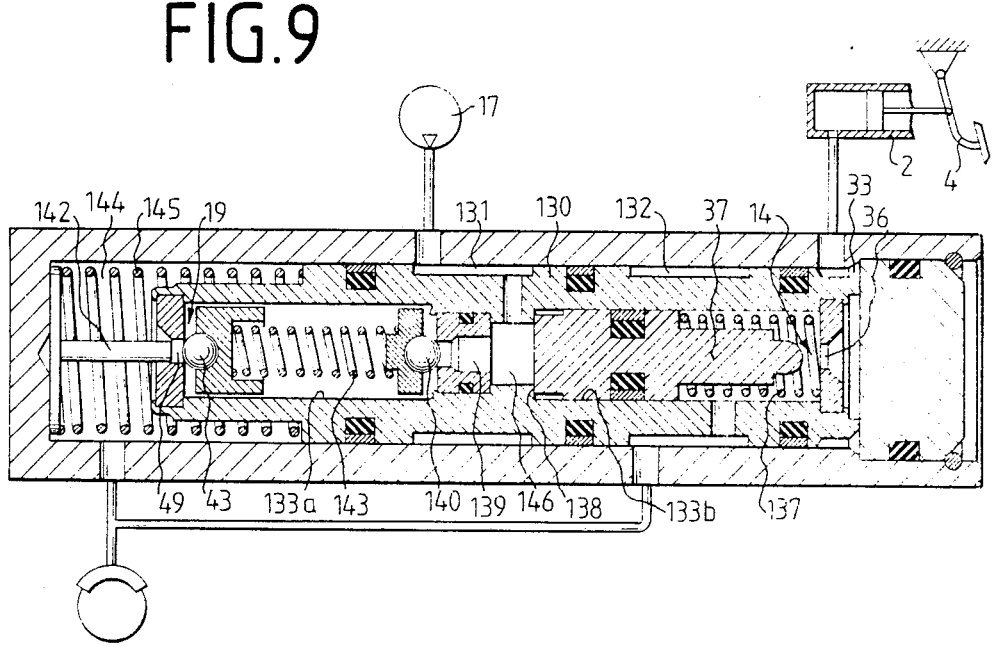

In the previous embodiments, the valve passage 36 of the separating valve 14 was provided on the housing. FIG. 9 displays an embodiment in which this valve passage is designed on the operating piston 130 for the regulating valve. The operating piston 130 confines with its right-hand end face a master-cylinder inlet chamber 33 and with its left-hand end face an outlet chamber 144. The connection to the pump unit is effected by way of an annular groove 131 which is in communication with a central chamber 146. A first axial bore 133a and a second axial bore 133b extend from this central chamber 146. The second bore 133b terminates into the pressure-fluid passage 36 of the separating valve 14. A closure member 37 is sealingly guided in the bore 133b and, loaded by the pressure in the central chamber 146, is shifted against the valve passage 36. The space between the closure member 37 and the valve passage 36 comprised by the bore 133b communicates with the wheel brakes by way of a transverse bore as well as by way of an annular groove 132 on the operating piston 130. The spring 137 keeps the piston 30 on the stop 138.

Succeeding the central chamber 146 in the first bore 133a, a first valve passage 139 is formed which is closed by a valve member 140. The pressure-fluid passage 49 of the regulating valve 19 is designed at the end of the bore 133a and is closed by a valve member 43. The valve members 43 and 140 are pressed against the valve passages by a spring 143 which takes support on these valve members. The first valve 139, 140 forms the schematically illustrated pressure-retaining valve 70 (FIG. 4), while the valve passage 49 and the closure member 43 form the regulating valve 19, which closure member 43 can be pushed open by a pin 142. This pin is formed fast with the housing and projects through the valve passage 49.

A spring 145 maintains the piston 130 in its right-hand position according to the illustration of FIG. 9. In the absence of pressure from chamber 146, the valve passage 36 is open so that a pressure-fluid connection exists between the master brake cylinder 2 and the wheel brakes. Since the chamber 144 also connects to the wheel brakes, the master cylinder pressure prevails therein so that the piston 130 is pressure-balanced. At the commencement of slip control, the pump delivers fluid into the central chamber 146 and loads the closure member 37 of the separating valve 14, whereby the separating valve 14 is closed. The pressure-retaining valve 70 then opens at a low pressure in the central chamber 146 so that pressure fluid flows into the bore 133a. To replenish pressure fluid in the wheel brake, pressure fluid is taken from the chamber 144, the piston 130 moving to the left as a result. The result thereof is that the pin 142 lifts the ball 43 from the valve passage 141 and pressure fluid out of the pump can flow into the chamber 144. A pressure proportional to pedal force develops in the chamber 144, since the pressure in the chamber 33 acts as a control pressure. Simultaneously, the chamber 144 acts as a reserve volume chamber, since the piston 130 moves beyond the position of regulation in case the pump cannot supply a sufficient amount of pressure fluid and there is a great demand of the wheel brakes in pressure fluid at the moment.

Figure 10:
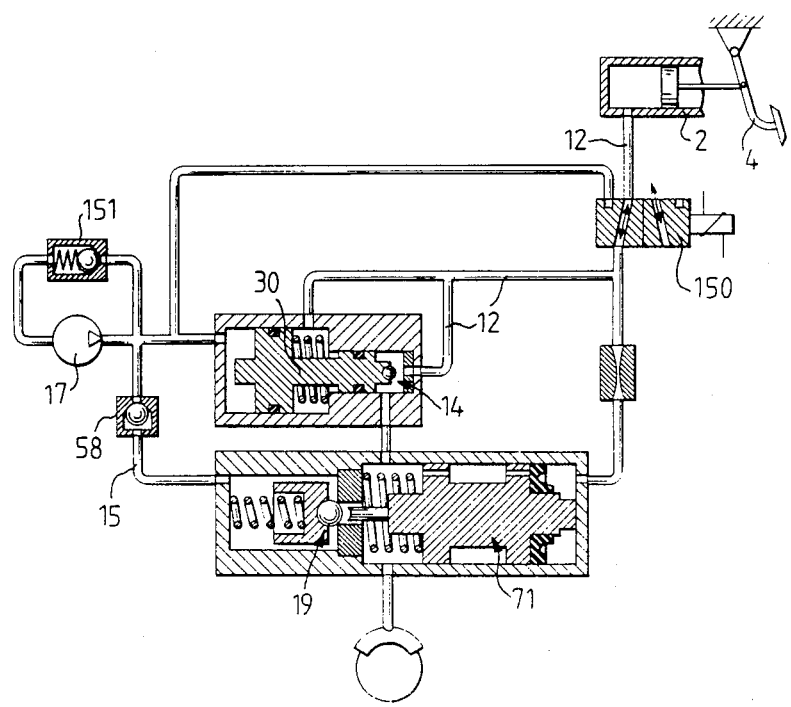

FIG. 10 illustrates how the system can be used for traction slip control as well. By means of a traction slip control valve 150, the master brake cylinder 2 is uncoupled from the brake line 12 and/or 13 and is connected directly to the outlet of the pump 7. An excess-pressure valve 151 defines a maximum pressure at the pump outlet. The illustration corresponds to FIG. 5 in all other respects. However, the proposed circuit arrangement also can be utilized in the other embodiments.

What is claimed is:

1. An anti-lock hydraulic brake system having a master brake cylinder (2), a pump unit (17, 18), a supply reservoir (11) and at least one wheel brake, a brake line between the master brake cylinder (2) and the wheel brake into which an inlet valve (21, 22) is inserted, a relief line (25) between the supply reservoir (11) and the wheel brakes into which an outlet valve (23, 24) is inserted, a pressure line (15, 16) from the pump unit (17, 18) to the brake line (12, 13), said system comprising, in combination: a separating valve (14) in the brake line (12, 13) between the master brake cylinder (2) and the point where the pressure line (15, 16) terminates into the brake line, which valve is switched by pump pressure to assume its closed position, and a regulating valve (19) for generating a pump pressure in the pressure line (15, 16) proportional to the pressure in the master brake cylinder (2), wherein the valve passage (36) of the separating valve (14) is operatively coupled to, communicates with, and is aligned with the valve passage (49) of the regulating valve (19).

2. A brake system as claimed in claim 1, wherein a non-return valve (58) is inserted into the pressure line (15, 16) which closes towards an outlet of the pump.

3. An anti-lock hydraulic brake system having a master brake cylinder (2), a pump unit (17, 18), a supply reservoir (11) and at least one wheel brake, a brake line between the master brake cylinder (2) and the wheel brake into which an inlet valve (21, 22) is inserted, a relief line (25) between the supply reservoir (11) and the wheel brakes into which an outlet valve (23, 24) is inserted, a pressure line (15, 16) from the pump unit (17, 18) to the brake line (12, 13), said system comprising, in combination: a separating valve (14) in the brake line (12, 13) between the master brake cylinder (2) and the point where the pressure line (15, 16) terminates into the brake line, which valve is switched by pump pressure to assume its closed position, and a regulating valve (19) for generating a pump pressure in the pressure line (15, 16) proportional to the pressure in the master brake cylinder (2), wherein the valve passage (36) of the separating valve (14) is operatively coupled to and communicates with the valve passage (49) of the regulating valve (19) is arranged on the operating piston (30) of the separating valve (14), wherein a non-return valve (58) is inserted into the pressure line (15, 16) which closes towards an outlet of the pump, and, wherein an operating piston (44) of the regulating valve (19) is arranged in an operating piston (30) of the separating valve (14).

4. A brake system as claimed in claim 3, wherein the operating piston (30) of the separating valve (14) is designed as stepped piston (30), the smaller end face being adjacent to the master-cylinder inlet chamber (33) which is in communication with the master cylinder (2), while the larger end face is adjacent to the pump inlet chamber (32) which is connected to the pump outlet, and in that the annular chamber (34) forming at the step transition is in communication with the supply reservoir (11).

5. A brake system as claimed in claim 3, wherein the valve passage (49) of the regulating valve (19) leads from the pump inlet chamber (32) into the annular chamber (34).

6. A brake system as claimed in claim 3, wherein the operating piston (44) of the regulating valve (19) is guided in an axial bore in the operating piston (30) of the separating valve (14) and, with its one end face, is adjacent to the master cylinder inlet chamber (34).

7. A brake system as claimed in claim 3, wherein the operating piston (44) of the regulating valve (19) is loaded by a spring (50) thereby closing the valve passage (49).

8. A brake system as claimed in claim 7, wherein the valve passage (36) of the separating valve (14) is arranged opposite to the end face of the operating piston (30) of the separating valve (14).

9. A brake system as claimed in claim 8, wherein closure members (101a, 101b) of the separating and regulating valves are provided on the opposite end faces of one common operating piston (102).

10. A brake system as claimed in claim 9, wherein the operating piston (30) of the separating valve (14) cooperates with an additional piston (119), the one end face of which confines a chamber (122) which is directly communicating with the pump outlet, while its other end face is movable into abutment on the operating piston (30) of the separating valve (14) and is adjacent to the outlet chamber (32) which is in communication with the wheel brakes.

11. A brake system as claimed in claim 10, wherein the operating piston (30) confines a chamber (32) which is in communication with the master cylinder (2) by way of a valve passage (36) and with the supply reservoir (11) by way of a valve passage (49), the valve passage (49) being controlled by a closure member (117) which is movable to bear against a pin (115) formed fast with the housing, and the valve passage (36) being controlled by a closure member (37) which is movable to bear against the operating piston (30).

12. A brake system as claimed in claim 11, wherein a throttle (110) is inserted between the chamber (122) and the chamber (32).

13. A brake system as claimed in claim 10, wherein the additional piston (119) is displaced such when acted upon by pump pressure that the operating piston (30) of the separating valve (14) is displaced thereby to close.

14. A brake system as claimed in claim 1, wherein an operating piston (37) of the separating valve (14) is arranged in the operating piston (130) of the regulating valve (19), with the valve passage (36) of the separating valve (14) being arranged in the operating piston (130) of the regulating valve (19).

15. A brake system as claimed in claim 14, wherein the valve passage (49) of the regulating valve (19) is arranged in the operating piston (130) of the regulating valve (19), with the closure member (43) of the regulating valve (19) cooperating with a stop (142) formed fast with the housing.

16. A brake system as claimed in claim 15, wherein the closure member (43) of the regulating valve (19) is arranged in the operating piston (130) of the regulating valve (19).

17. An anti-lock hydraulic brake system having a master brake cylinder (2), a pump unit (17, 18), a supply reservoir (11) and at least one wheel brake, a brake line (12, 13) between the master brake cylinder (2) and the wheel brake into which an inlet valve (21, 22) is inserted, a relief line (25) between the supply reservoir (11) and the wheel brakes into which an outlet valve (23, 24) is inserted, and a pressure line (15, 16) from the pump unit (17, 18) to the brake line (12, 13), said system comprising in combination: a separating valve (14) in the brake line between the master brake cylinder and the point where the pressure line terminates into the brake line, which valve is switched by the pump pressure to assume its closed position, and a regulating valve for generating a pump pressure in the pressure line (15, 16) proportional to the pressure in the master brake cylinder (2), wherein connected in parallel to the separating valve (14) is a charging chamber means (71), wherein an accumulator piston (74) is sealingly guided in the charging chamber means (71), one end face of said piston being adjacent to a master-cylinder pressure chamber, while its other end face is adjacent to an accumulator chamber (76).

18. A brake system as claimed in claim 17, wherein the master-cylinder pressure chamber (75) has its smallest volume in the basic position of the accumulator piston (74).

19. A brake system as claimed in claim 17, wherein the master-cylinder pressure chamber (75) has its largest volume in the basic position of the accumulator piston (74).

20. An anti-lock hydraulic brake system having a master brake cylinder (2), a pump unit (17, 18), a supply reservoir (11) and at least one wheel brake, a brake line (12, 13) between the master brake cylinder (2) and the wheel brake into which an inlet valve (21, 22) is inserted, a relief line (25) between the supply reservoir (11) and the wheel brakes into which an outlet valve (23, 24) is inserted, and a pressure line (15, 16) from the pump unit (17, 18) to the brake line (12, 13), said system comprising: a separating valve (14) in the brake line between the master brake cylinder and the point where the pressure line terminates into the brake line, which valve is switched by the pump pressure to assume its closed position, and a regulating valve for generating a pump pressure in the pressure line (15, 16) proportional to the pressure in the master brake cylinder (2), wherein connected in parallel to the separating valve (14) is a charging chamber means (71), wherein an accumulator piston (74) is sealingly guided in the charging chamber means (71), one end face of said piston being adjacent to a master-cylinder pressure chamber, while its other end face is adjacent to an accumulator chamber (76), wherein the accumulator piston (74) is arranged as an annular piston (90) which is guided coaxially to the operating piston (30) of the separating or regulating valves.

21. A brake system as claimed in claim 17, wherein the operating piston (30) of the separating or regulating valves is displaceable by a predetermined travel s which is larger than the valve travel of the separating valve (14).

22. A brake system as claimed in claim 21, wherein the closure member (37) of the separating valve is pressed in its basic position against a stop (40) by a spring (39).

23. A brake system as claimed in claim 17, wherein the closure member (43) of the regulating valve (19) is displaceable beyond the regulation position.

24. An anti-lock hydraulic brake system having a master brake cylinder (2), a pump unit (17, 18), a supply reservoir (11) and at least one wheel brake, a brake line (12, 13) between the master brake cylinder (2) and the wheel brake into which an inlet valve (21, 22) is inserted, a relief line (25) between the supply reservoir (11) and the wheel brakes into which an outlet valve (23, 24) is inserted, and a pressure line (15, 16) from the pump unit (17, 18) to the brake line (12, 13), said system comprising: a separating valve (14) in the brake line between the master brake cylinder and the point where the pressure line terminates into the brake line, which valve is switched by the pump pressure to assume its closed position, and a regulating valve for generating a pump pressure in the pressure line (15, 16) proportional to the pressure in the master brake cylinder (2), wherein connected in parallel to the separating valve (14) is a charging chamber means (71), wherein an accumulator piston (74) is sealingly guided in the charging chamber means (71), one end face of said piston being adjacent to a master-cylinder pressure chamber, while its other end face is adjacent to an accumulator chamber (76), wherein the closure member (101a) of the separating valve (14) is provided as a slide which can be introduced into a bore (150).

25. A brake system as claimed in claim 17, wherein connected downstream of the pump (17, 18) is a pressure-retaining valve (70).

26. A brake system as claimed in claim 25, wherein the pressure-retaining valve (70) is arranged in the operating piston (130) of the regulating valve (19).

27. A brake system as claimed in claim 17, wherein a traction-slip control valve (150) is inserted into the brake line (12, 13) which connects the pump unit (17, 18) instead of the master brake cylinder (2) to the brake line (12, 13).

* * * * *